UNITED STATES PATENT OFFICE.

CONRAD SCHRAUBE AND WALTER VOIGTLAENDER-TETZNER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

RED DISAZO DYE AND PROCESS OF MAKING SAME.

SPECIFICATION forming part of Letters Patent No. 713,507, dated November 11, 1902.

Application filed August 13, 1901. Serial No. 71,919. (No specimens.)

*To all whom it may concern:*

Be it known that we, CONRAD SCHRAUBE, a subject of the King of Prussia, German Emperor, and WALTER VOIGTLAENDER-TETZNER, a subject of the King of Saxony, doctors of philosophy and chemists, residing at Ludwigshafen-on-the-Rhine, in the Kingdom of Bavaria, Germany, have invented new and useful Improvements in Red Disazo Dyes and Processes of Making Same, of which the following is a specification.

Several mixed disazo coloring-matters obtained from benzidine and salicylic acid and a further component have already been described in various publications. We have now discovered a certain new class of such mixed disazo coloring-matters possessing very valuable properties. The said new class of coloring-matters is obtained according to our invention when the intermediate product resulting from the combination of tetrazo-diphenyl with salicylic acid is combined with 1-naphthol-3-sulfo-acid or with sulfo-acids which may be regarded as derived from this, but which contain a further sulfo group in a beta position. Also certain amido derivatives of these acids can be used; but it is the characteristic feature of our invention that this compound is a naphthalene derivative with a sulfo group in the position three and a hydroxyl group in the position one. The new coloring-matter thus obtained when using the 1-naphthol-3-sulfo-acid dyes wool from the acid-bath, and if the dyed wool be then treated with chromic acid a brilliant red, possessing a bluish tinge and considerable fastness to fulling, is obtained. Similarly, also, the coloring-matters obtained by using the 1.3.6 and 1.3.7 naphthol-disulfo-acids yield beautiful shades fast to milling, and these coloring-matters are advantageously distinguished from that obtained by using 1.3.8 naphthol-disulfo-acid (one of whose sulfo groups is in an alpha position) by their superior fastness to light. Amido-naphthol sulfo-acids which contain a sulfo group in the position three to the hydroxyl group in the position one and which have an acid residue introduced into the amido group, so that the acids no longer have the character of amido-naphthol-sulfo-acids, but more that of naphthol sulfo-acids, can also be used in carrying out our invention. We except, however, aceytl-6-amido-1-naphthol-3-sulfo-acid, the use of which we do not claim for carrying out our invention. Instances of acids of this class are benzoyl-gamma-acid, which may be called "7-benzoylamido-1-naphthol-3-sulfo-acid," also "benzol-I-acid"—that is, 6-benzoyl-amido-1-naphthol-3-sulfo-acid—and benzoyl-M-acid—that is, 5-benzoyl-amido-1-naphthol-3-sulfo-acid. The coloring-matters resulting from the combination of these components with the intermediate product from tetrazo-diphenyl and salicylic acid are red dyes with considerable fastness to milling, and they may be obtained either by combining the tetrazo compound first with salicylic acid and then with the other component, or the order of the combination may be inverted.

The following table shows some of the properties of some of the coloring-matters obtainable according to our invention:

| Benzidine<Salicylic acid / X. | Color of the aqueous solution. | On addition of concentrated hydrochloric acid. | On addition of concentrated caustic-soda lye. | Solution in concentrated sulfuric acid, (96%.) | Solution in alcohol. |
|---|---|---|---|---|---|
| 1-naphthol-3-sulfo-acid | Blue-red | Reddish-brown precipitate. | Yellow-red solution | Violet | Somewhat soluble. |
| 1.3.6 naphthol-disulfo-acid | Blue-red | Reddish-brown precipitate. | Yellow-red solution | Violet | Insoluble. |
| Benzoyl-6-amido-1-naphthol-3-sulfo-acid | Red | Reddish-brown precipitate. | Blue-red solution or precipitate. | Blue | Somewhat soluble. |
| Benzoyl-7-amido-1-naphthol-3-sulfo-acid | Blue-red | Violet-brown precipitate. | Yellow-red solution | Violet | Somewhat soluble. |
| Benzoyl-5-amido-1-naphthol-3-sulfo-acid | Blue-red | Violet-brown precipitate. | Yellow-red solution | Violet | Somewhat soluble. |

On reduction with zinc-dust and ammonia they yield benzidine, para-amido-salicylic acid, and an amido derivative of the 1-naphthol-3-sulfo-acid substance originally employed.

The following examples will serve to further illustrate the nature of our invention and the manner in which the same may be carried into practical effect; but the invention is not confined to the said examples. The parts are by weight.

Example 1: Prepare a solution of tetrazodiphenyl chlorid in the usual way from one hundred and eighty-four (184) parts of benzidine, six hundred (600) parts of hydrochloric acid, (containing about thirty per cent. of HCl,) and one hundred and thirty-eight (138) parts of sodium nitrite. Run the tetrazo compound into a solution of one hundred and thirty-eight (138) parts of salicylic acid, eight hundred (800) parts of calcined soda, and five thousand (5,000) parts of water. The intermediate product forms in the course of a few hours and separates out as a yellow to red-brown precipitate. To this add a solution of three hundred and forty-eight (348) parts of 1-naphthol-3.6-disulfo-acid (sodium salt) and one hundred (100) parts of calcined soda in five thousand (5,000) parts of water. Stir the mixture for about twelve (12) hours, heat it until it boils, precipitate it with common salt, filter while hot, press, and dry.

Example 2: Prepare a solution of tetrazodiphenyl chlorid as described in the foregoing example and run it into a solution of three hundred and forty-eight (348) parts of the sodium salt of 1-naphthol-3.6-disulfo-acid and one thousand (1,000) parts of calcined soda in ten thousand (10,000) parts of water. When the formation of the intermediate product is complete, precipitate it with common salt and collect it by filtering. Add it to a solution of one hundred and thirty-eight (138) parts of salicylic acid and two hundred (200) parts of calcined soda in five thousand (5,000) parts of water, to which one hundred and twenty (120) parts of caustic-soda lye (containing thirty-five per cent. of NaOH) are further added. Stir the mixture for about twelve (12) hours, then heat it, salt the coloring-matter out from the hot solution, filter, press, and dry.

Example 3: Prepare the intermediate product from benzidine and salicylic acid, as described in the foregoing Example 1, and to the liquid containing this product in suspension add a solution of three hundred and forty-three (343) parts of 5.benzoylamido-1-naphthol-3-sulfo-acid and two hundred (200) parts of calcined soda in five thousand (5,000) parts of water. Stir the mixture for about twelve (12) hours, then salt out, and precipitate the coloring-matter with common salt from the hot solution, filter, press, and dry.

Now what we claim is—

1. The new disazo coloring-matter such as can be obtained by combining the intermediate substance, obtainable from one molecular proportion of tetrazo-diphenyl and one molecular proportion of salicylic acid, with a hereinbefore-defined 1.naphthol-3-sulfo-acid substance which is soluble in water with a bluish-red, to red, color, which solution on the addition of hydrochloric acid yields a reddish-brown, to violet-brown, precipitate and on reduction with zinc-dust and ammonia yields benzidine, para-amido-salicylic acid and an amido derivative of the 1.3-naphthol-sulfo-acid substance originally employed.

2. The new disazo coloring-matter such as can be obtained by combining the intermediate substance obtainable from one molecular proportion of tetrazo-diphenyl and one molecular proportion of salicylic acid with 1.naphthol-3.6-disulfo-acid which is soluble in water with a blue-red color, which solution on the addition of hydrochloric acid yields a reddish-brown precipitate and on reduction with zinc-dust and ammonia yields benzidine, para-amido-salicylic acid and 2-amido-1-naphthol-3.6-disulfo-acid.

In testimony whereof we have hereunto set our hands in the presence of two subscribing witnesses.

CONRAD SCHRAUBE.
WALTER VOIGTLAENDER-TETZNER.

Witnesses:
JOHN L. HEINKE,
M. SCHUMANN.